United States Patent [19]

Yamanaka

[11] Patent Number: 4,894,815
[45] Date of Patent: Jan. 16, 1990

[54] OPTICAL HEAD FOR READING INFORMATION FROM A MAGNETOOPTIC RECORDING MEDIUM

[75] Inventor: Yutaka Yamanaka, Tokyo, Japan
[73] Assignee: NEC Corporation, Tokyo, Japan
[21] Appl. No.: 175,978
[22] Filed: Apr. 1, 1988
[30] Foreign Application Priority Data Apr. 1, 1987 [JP] Japan .................................. 62-81571

[51] Int. Cl.⁴ .............................................. G11B 7/00
[52] U.S. Cl. ...................................... 369/112; 369/13; 369/110; 360/114
[58] Field of Search ...................... 358/342; 369/43–47, 369/13, 109, 118, 112, 121, 110; 360/114; 365/122

[56] References Cited

U.S. PATENT DOCUMENTS 4,125,860 11/1978 Ishii et al. ........................ 369/32 X
4,561,032 12/1985 Matsumoto et al. ............. 369/13 X
4,787,076 11/1988 Deguchi et al. ....................... 369/46

OTHER PUBLICATIONS

T. Deguchi et al., "Digital Magnetooptic Disk Drive", Applied Optics, vol. 23, No. 22, Nov. 15, 1984.

Primary Examiner—Robert L. Richardson
Attorney, Agent, or Firm—Sughrue, Mion, Zinn, Macpeak & Seas

[57] ABSTRACT

A head for a magnetooptic recording medium comprises two grating means for diffracting light beams having polarized light components orthogonal to each other which are reflected from a magnetooptic recording medium. The lights which are diffracted by the two grating means are directed to means for detecting a polarized light rotation and a position error so that a head for a magnetooptic recording medium is simplified in its construction and smaller in its size.

4 Claims, 3 Drawing Sheets

OPTICAL HEAD FOR READING INFORMATION FROM A MAGNETOOPTIC RECORDING MEDIUM

FIELD OF THE INVENTION

The invention relates to a head for a magnetooptic recording medium, and more particularly to a head for a magnetooptic recording medium in which information is stored in accordance with the direction of magnetization.

BACKGROUND OF THE INVENTION

A conventional head for a magnetooptic disk has been described on pages 3972 to 3978 of "APPLIED OPTICS, Vol. 23, No. 22, 15 Nov., 1984". The conventional head comprises a semiconductor laser for radiating laser beam, a collimating lens for collimating the laser beam, an objective lens for focusing the laser beam on a disk, two beam splitters positioned between the collimating and objective lenses, and two means corresponding to the two beam splitters for detecting the polarization rotation of the laser beam reflected from the disk and for detecting a position error of a beam spot on the disk.

In operation, the laser beam which is radiated from the semiconductor laser is collimated by the collimating lens, then passed through the two beam splitters, and focussed on the disk by the objective lens. The laser beam is a linearly polarized light which is focussed to a minute beam spot on the disk. The light beam reflected from the disk is introduced to the two detecting means by the two beam splitters, respectively. In the means for detecting polarization rotation of the reflected laser beam, a direction of magnetization in the disk is detected in accordance with the difference of light amounts between P and S polarized lights which are divided therein as described in more detail later. In the means for detecting a position error of a beam spot on the disk, on the other hand, focus and track errors are detected in accordance with the knife edge and push-pull methods as also described in more detail later.

Another conventional head for an optical recording medium has been described in Japanese patent application No. 61-14144. The conventional head comprises a semiconductor laser for radiating a laser beam, an objective lens for focusing the laser beam on a disk, a grating means for diffracting the laser beam which is reflected from the disk, the two, two-divided detecting means for detecting focus and track errors. The grating means includes upper and lower planes, one having a different pitch of gratings from other.

In operation, the laser beam radiated from the semiconductor laser is focussed to a minute beam spot on the disk by the objective lens. The laser beam which is reflected from the disk is partially diffracted by the upper and lower planes of the grating means. The light beams thus diffracted in different directions are received in the two, two-divided detecting means so that focus and track errors are detected in accordance with the knife edge and push-pull methods, respectively.

In general, a magnetooptic recording system provides high density recording found in optical recording systems and a re-writing ability found in magnetic recording systems so that it can be applied to a system in which a file having a large capacity is included. As described before, information is read from the disk in accordance with a magnetic Kerr effect. That is, a polarized plane of light reflected from the disk is rotated dependent on a direction of magnetization in the disk when a linearly polarized light is supplied to the disk.

According to the conventional head first discussed herein however, the means for detecting polarization rotation comprises a half wave plate, a polarized beam splitter, a pair of focusing lenses and so on, and the means for detecting a position error of a beam spot on the disk comprises a focusing lens, a beam splitter and so on, so that the construction of the head is complicated and the size thereof is not small.

According to the conventional head second discussed herein, further, there is the disadvantage that means for detecting polarized light rotation is complicated and is not small for the same reason as in the first discussed conventional head, although means for detecting a position error of a beam spot on the disk is simplified by using a grating means as described above.

SUMMARY OF THE INVENTION

Accordingly, it is an object of the invention to provide a head for a magnetooptic recording medium in which a construction thereof is simplified.

It is a further object of the invention to provide a head for a magnetooptic recording medium in which the size thereof is smaller.

It is a still further object of the invention to provide a head for a magnetooptic recording medium in which an access time thereof can be shortened in accordance with a smaller size thereof.

According to the invention, a head for a magnetooptic recording medium comprises, means for radiating a light beam, means for focusing said light beam on a magnetooptic recording medium, two grating means each diffracting a light beam which is reflected from said magnetooptic recording medium, and means for detecting the light beams which are diffracted by said two grating means, wherein said two grating means diffract two tight beams one having a polarized light component orthogonal to that of the other.

BRIEF DESCRIPTION OF THE DRAWINGS

The invention will be described in more detail in conjunction with following drawings wherein.

DESCRIPTION OF THE PREFERRED EMBODIMENTS

Figure 1:
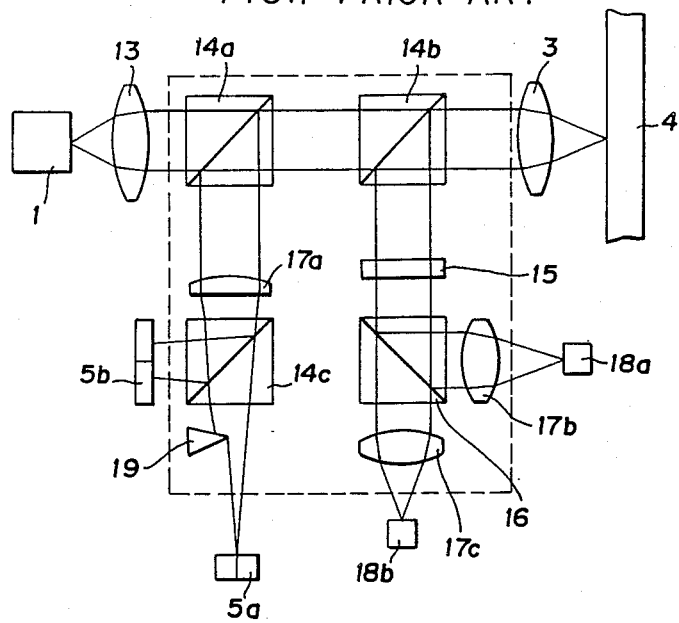
FIG. 1 is an explanatory view showing a conventional head for a magnetooptic recording medium.

Before explaining a head for a magnetooptic recording medium in an embodiment according to the invention, a conventional head for a magnetooptic recording medium, as briefly explained before, will be described. In FIG. 1, there is shown in conventional head which comprises a semiconductor laser 1 for radiating a laser beam, a collimating lens 13 for collimating the laser beam, an objective lens 3 for focusing the laser beam on a disk 4, two beam splitters 14a and 14b positioned between the collimating and objective lenses 13 and 3, and two means corresponding to the two beam splitters 14a and 14b for detecting polarization rotation of the laser beam which is reflected from the disk 4 and for detecting a position error of a beam spot on the disk 4. The means for detecting polarization rotation of the reflected laser beam comprises a half wave plate 15 for rotating a polarizing plane of the laser beam by 45 degrees, a polarizing beam splitter 16 for dividing the laser beam into S and P polarized lights, and focusing lenses 17b and 17c for focusing the S and P polarized lights on photodetectors 18a and 18b respectively, while the means for detecting a position error of a beam spot on the disk 4 comprises a focusing lens 17a for focusing the laser beam reflected from the disk 4, a beam splitter 14c for dividing the laser beam into two laser beams, a knife edge 19 for shielding half of the divided laser beam, two-divided photodetector 5a for detecting the laser beam which is not shielded by the knife edge 19, and two-divided photodetector 5b for detecting the other divided laser beam of the beam splitter 14c.

In operation, the laser beam radiated from the semiconductor laser 1 is made parallel by the collimating lens 13 and then passed through the two beam splitters 14a and 14b to be focussed on the disk 4 by the objective lens 3. The laser beam is a linearly polarized light which is focussed to a minute beam spot on the disk 4. The light beam reflected from the disk 4 is divided into the laser light beams by the beam splitters 14a and 14b respectively. The polarization of of the divided laser beams of the beam splitter 14b is rotated in the half wave plate 15 by 45 degrees, and then divided into S and P polarized lights by the polarizing beam splitter 16. The S and P polarized lights are focussed by the focusing lenses 17b and 17c and detected by the photodetectors 18a and 18c. As a result, a magnetization direction of the disk 4 is detected in accordance with the subtraction of light amounts between the S and P polarized lights. Such means for detecting polarization rotation of a beam spot is indispensable to a head for a magnetooptic recording medium thereby inviting a complication of a construction therein. On the other hand, one of the divided laser beams of the beam splitter 14a is focussed by the focusing lens 17a, and then divided into two laser beams by the beam splitter 14c. One of the two laser beams thus divided is partially shielded by the knife edge 19 so that a half of the laser beam is received in the two-divided photodetector 5a, while the other of the two laser beams is received in the two-divided photodetector 5b. As a result, a focus error is detected the knife edge method in accordance with signals of the two-divided photodetector 5a, and a track error is detected by the push-pull method in accordance with signals of the two-divided photodetector 5b.

Figure 2:
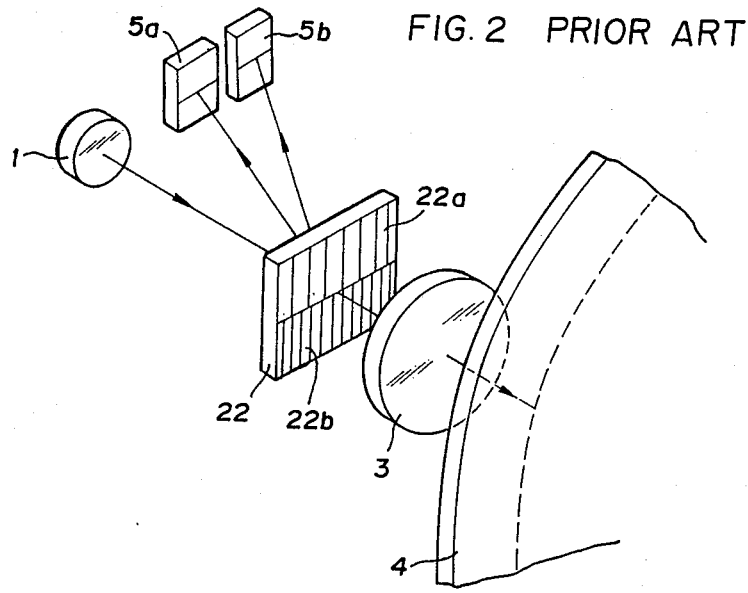
FIG. 2 is a perspective view showing another conventional head for an optical recording medium.

In FIG. 2, there is shown another conventional head for an optical recording medium which comprises a semiconductor a laser 1 for radiating laser beam, an objective lens 3 for focusing the laser beam on a disk 4, a grating means 22 for diffracting the laser beam which is reflected from the disk 4, and two two-divided detecting means 5a and 5b for detecting focus and track errors. The grating means 22 includes upper and lower planes 22a and 22b, one 22a having a different grating pitch from other 22b.

In operation, the laser beam which is radiated from the semiconductor laser 1 is focussed to a minute beam spot on the disk 4 by the objective lens 3. The laser beam which is reflected from the disk 4 is partially diffracted by the upper and lower planes 22a and 22b of the grating means 22. The light beams thus diffracted in different directions are received in the two two-divided detecting means 5a and 5b. In each of the two two-divided detecting means 5a and 5b, the addition of light amounts between the divided detecting elements is performed, and the subtraction between the two additions is performed to produce a track error signal by the so called push-pull method, while a focus error is detected by the so called knife edge method in accordance with signals of the respective two-divided detecting means 5a and 5b.

Next, a head for a magnetooptic recording medium in an embodiment according to the invention will be explained with reference to FIG. 3. The head comprises a semiconductor laser 1 for radiating a laser beam, a pair of grating means 32 and 33 to be described in more detail later, an objective lens 3 for focusing the laser beam on a disk 4, a two-divided detecting means 5 for receiving diffracted light of the grating means 32, a and four-divided detecting means 6 for receiving diffracted light of the grating means 33. The grating means 32 and 33 are positioned on a light axis of the laser beam to diffract polarized light components of the laser beam from the disk 4 which are orthogonal to each other, and each of them is provided with two grating planes 32a and 32b, and 33a and 33b, one having a grating pitch which is different from the other as illustrated therein. For the reason described above, dividing lines, each dividing the two grating planes 32a and 32b, and 33a and 33b are orthogonal to each other. In other words, each of the grating means 32 and 33 is a kind of an analyzer or polarizing beam splitter which diffracts light having a specified polarized component of an incident light.

Figure 4:
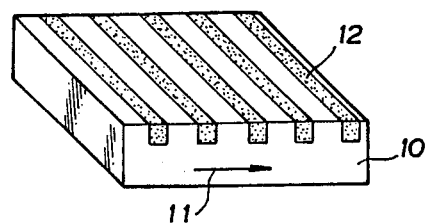
FIG. 4 is a perspective view explaining a grating means which is applicable to a head for a magnetooptic recording medium in the embodiment.

Such grating means is structured as shown in FIG. 4 wherein an anisotropic plate 10 having a refractive index anisotropy are formed to have grating grooves thereon into which a material 12 having a predetermined refractive index is filled. If it is assumed that refractive indexes of the anisotropic plate 10 are $n_e$ in a direction of an optical axis 11 and $n_o$ in a direction orthogonal to the optical axis 11, only a polarized light component orthogonal to the optical axis 11 is diffracted in a case where a material 12 having the refractive index $n_e$ is filled thereinto, while only a polarized light component parallel to the optical axis 11 is diffracted in a case where a material 12 having the refractive index $n_o$ is filled thereinto.

There is shown another grating means wherein an anisotropic plate 10 having an optical axis 11 is formed to have grating grooves on both surfaces thereof into which a material 12a having a refractive index $n_e$ is filled on the top surface, while a material 12b having a refractive index $n_o$ is filled on the back surface. As a result, a single sheet grating means can be fabricated to diffract two polarized light components orthogonal to each other.

For instance, quartz or calcite may be used for an anisotropic plate of a grating means in the invention. In a near infrared region, refractive indexes $n_e$ and $n_o$ of quartz are 1.5509 and 1.5419, and those $n_e$ and $n_o$ of calcite are 1.4846 and 1.6544, while glass and plastic materials like acryl system and epoxy system may be used for a filling material of the grating means having a refractive index of approximately 1.4 to 1.7. By using such materials, a grating means, in which a diffraction angle of 20 degrees is obtained at a wavelength of 0.8 μm, can be fabricated in a case where the pitch of the diffraction grating grooves is 2.5 μm.

Figure 3:
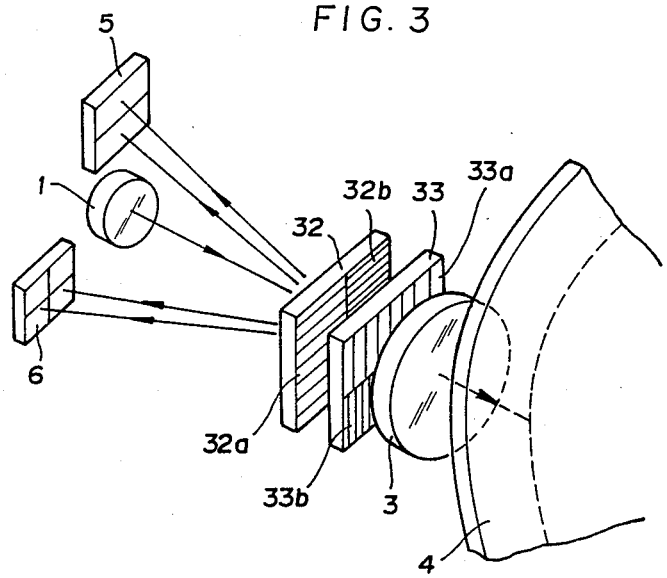
FIG. 3 is a perspective view showing a head for a magnetooptic recording medium in an embodiment according to the invention.
Figures 6A, 6B, 6C:
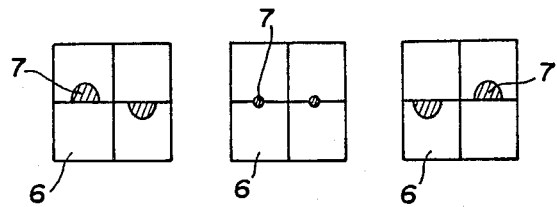
FIGS. 6A to 6C are explanatory views explaining a detection of a focus error by use of a four-divided detecting means.

In operation of the head as shown in FIG. 3, a laser beam radiated from the semiconductor laser 1 is passed through the grating means 32 and 33, and focussed to a minute beam spot on the disk by the objective lens 4. The laser beam reflected from the disk 4 is diffracted by the grating means 32 and 33. Two lights diffracted by the grating means 32 are received in two different photodetectors of the two-divided detecting means 5 respectively, while two lights diffracted by the grating means 33 are focussed on a dividing line of the four-divided detecting means 6. A polarized light rotation is detected in accordance with a calculation in which a subtraction is performed between adding results of the respective photodetectors in each of two and four-divided detecting means 5 and 6, a track error is detected in accordance with a calculation in which a subtraction is performed between the two photodetector outputs of the two-divided detecting means 5, and a focus error is detected in accordance with a calculation in which a subtraction is performed between two adding results of respective two outputs of the respective two photodetectors which are positioned to be diagonal in the four-divided detecting means 6. As shown in FIGS. 6A to 6C, the size of two beam spots 7 is changed on the four-divided detecting means 6 depending on the extent to which a focus error is occured. FIG. 6B shows that the laser beam is exactly focussed on the disk 4 by the objective lens 3, and FIGS. 6A and 6C show that the laser beam is defocussed on the disk in the opposite directions of the laser beam axis thereby producing a focus error signal.

Figure 7:
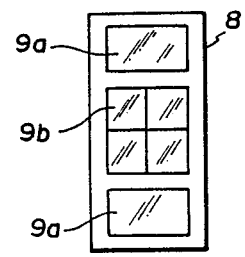
FIG. 7 is an explanatory view showing a detecting means which is composed of two and four-divided detecting means.

In the embodiment, although the two and four-divided detecting means 5 and 6 are separately provided, these may be replaced by a single six-divided detecting means 8 in which two photodetectors 9a for receiving the diffracted lights from the grating means 33 and four-divided detecting means 9b for receiving the diffracted lights from the grating means 32 are combined together as shown in FIG. 7.

Further, a relief type of a diffraction grating having a concave and convex surface pattern thereon may be used in place of the aforementioned grating means 32 and 33. In such a diffraction grating, light having a specified polarized component is mainly diffracted by making a grating pitch narrow to the same extent as a wavelength of laser beam.

Still further, a collimating lens may be added to a head for a magnetooptic recording medium in the embodiment. The grating means may be brazed to produce only plus and minus first order diffraction lights so that utilizing efficiency of light is increased, and may be of not only a transmitting type, but also a reflecting type.

In conclusion, the portion indicated by dotted lines in the conventional head for a magnetooptic recording medium as shown FIG. 1 is replaced by two grating means for diffracting lights having polarized components orthogonal to each other in the invention so that a head for a magnetooptic recording medium according to the invention is simplified in its construction and smaller in its size.

Although the invention has been described with respect to specific embodiments for complete and clear disclosure, the appended claims are not to thus limited but are to be construed as embodying all modification and alternative constructions that may occur to one skilled in the art which fairly fall within the basic teaching herein set forth.

What is claimed is:

1. An optical head for reading information from a magnetooptic recording medium, comprising:
    a semiconductor laser device from which a light beam radiates;
    an objective lens for focusing said light beam on said magnetooptic recording medium;
    first and second optical gratings provided serially on a light axis of said light beam which is reflected from said magnetooptic recording medium, said first and second optical gratings diffracting said reflected light beam to supply first and second light beams having polarized components orthogonal to each other; and
    first and second photodetectors for detecting said first and second diffracted light beams to read information stored in said magnetooptic recording medium, and to detect tracking and focusing errors.

2. An optical head for reading information from a magnetooptic recording medium according to claim 1, wherein each of said first and second optical gratings is a relief type diffraction grating having a concave and convex pattern on one surface thereof.

3. An optical head for reading information from a magnetooptic recording medium according to claim 1, wherein:
    each of said first and second optical gratings is composed of an anisotropic plate, said anisotropic plate being provided with parallel grooves formed on one surface thereof with a predetermined pitch, and a material having a predetermined refractive index filling said grooves.

4. An optical head for reading information from a magnetooptic recording medium according to claim 1, wherein:
    each of said first and second optical gratings is composed of an anisotropic plate, said anisotropic plate being provided with parallel grooves on both surfaces thereof with the grooves on one of said both surfaces having a predetermined but different pitch then predetermined pitch of grooves of the other of said both surfaces, and two materials having different refractive indices filling grooves of said different pitches, respectively.

* * * * *

UNITED STATES PATENT AND TRADEMARK OFFICE
CERTIFICATE OF CORRECTION

PATENT NO. : 4,894,815

DATED : January 16, 1990

INVENTOR(S) : Yutaka YAMANAKA

Figure 5:
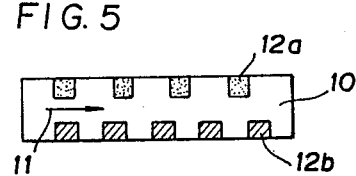
FIG. 5 is a side view explaining another grating means which is also applicable to a head for a magnetooptic recording medium in the embodiment.

It is certified that error appears in the above-identified patent and that said Letters Patent is hereby corrected as shown below:

Col. 2, line 42, delete "tight" and insert --light--;

Col. 4, line 62, delete "There is shown" and insert --FIG. 5 shows--.

Signed and Sealed this

Twenty-sixth Day of February, 1991

*Attest:*

HARRY F. MANBECK, JR.

*Attesting Officer*  *Commissioner of Patents and Trademarks*